United States Patent [19]

Stockinger et al.

[11] Patent Number: 4,550,203
[45] Date of Patent: Oct. 29, 1985

[54] PROCESS FOR THE PREPARATION OF N-SUBSTITUTED N-CYANCARBOXYLIC ACID AMIDES

[75] Inventors: Friedrich Stockinger, Hölstein; Friedrich Lohse, Oberwil; Helmut Zondler, Bottmingen, all of Switzerland

[73] Assignee: Ciba Geigy Corporation, Ardsley, N.Y.

[21] Appl. No.: 466,456

[22] Filed: Feb. 15, 1983

[30] Foreign Application Priority Data

Feb. 23, 1982 [CH] Switzerland ................... 1106/82

[51] Int. Cl.$^4$ ............................................. C07C 125/08
[52] U.S. Cl. .............................. 564/105; 260/404.5; 564/103; 564/106
[58] Field of Search ............... 564/103, 105, 106; 260/404.5 CN

[56] References Cited

U.S. PATENT DOCUMENTS 3,692,832  9/1972  Rider .......................... 564/106 X
4,206,141  6/1980  Mihailovski ..................... 564/106

FOREIGN PATENT DOCUMENTS

EP 88047  9/1983  European Pat. Off. ........... 564/106

*Primary Examiner*—Thomas A. Waltz
*Attorney, Agent, or Firm*—Luther A. R. Hall

[57] ABSTRACT

N-substituted N-cyanocarboxylic acid amides are prepared by reacting 1 mol of an N-cyanocarboxylic acid amide salt with 1 mol of an alkyl halide or an alkylating agent, for example dimethyl sulfate or diethyl sulfate, in a polar aprotic solvent.

The N-substituted N-cyanocarboxylic acid amides which can be obtained by the process according to the invention are useful curing agents for epoxide resins.

3 Claims, No Drawings

PROCESS FOR THE PREPARATION OF N-SUBSTITUTED N-CYANCARBOXYLIC ACID AMIDES

The present invention relates to a process for the preparation of N-Substituted N-cyanocarboxylic acid amides and to the use of the compounds prepared according to the invention as hardeners for epoxide resins.

Journal or Organic Chemistry, Volume 28 (1963), pages 1816–1821 reports that N-cyanocetimide methyl ester partly rearranges to the isomeric N-cyano-N-methylacetamide on heating to 165° C. Chemische Berichte, 99 (10), 1966, pages 3155–3162 furthermore states that when methyl-tert.-butylcarbodiimide is split with benzoyl chloride, N-cyano-N-methylbenzamide is formed, in addition to isobutylene and tert.-butyl chloride, and if trichloroacetyl chloride is used as the splitting agent, N-cyano-N-methyltrichloroacetamide, inter alia, is formed.

We have now found that better yields of N-substituted N-cyanocarboxylic acid amides are obtained in a simpler manner if an N-cyanocarboxylic acid amide salt is reacted with an alkylating agent, for example an alkyl halide or dimethyl sulfate, in a polar aprotic solvent.

The present invention thus relates to a process for the preparation of N-substituted N-cyanocarboxylic acid amides of the formula I

in which $R_1$ is a hydrogen atom, alkyl having 1–16 C atoms, cycloalkyl having 5–8 C atoms or aryl having 6 or 10 ring C atoms and $R_2$ is alkyl having 1–8 C atoms, cycloalkyl having 5–8 atoms or benzyl, which comprises reacting, in a molar ratio, 1 mol of an N-cyanocarboxylic acid amide salt of the formula II

in which $R_1$ is as defined under formula II and $M\oplus$ is an Na or K cation, either with 1 mol of a compound of the formula III

in which $R_2$ is as defined under formula I and X is a chlorine, bromine or iodine atom, or, if $R_2$ in formula I is methyl or ethyl, with 1 mol of dimethyl or diethyl sulfate or trimethyl or triethyl phosphonate as the alkylating agent, in a polar aprotic solvent.

An alkyl group $R_1$ can be straight-chain or branched, unsubstituted or substituted or also interrupted by etheroxygen atoms. Examples of suitable substituents are chlorine and bromine atoms and the nitro group. A cycloalkyl group $R_1$ can be unsubstituted or also substituted with these substituents. Examples of such alkyl groups are methyl, chloromethyl, ethyl, 1-chloroethyl, 2-bromoethyl, n-propyl, isopropyl, 3-bromopropyl, n-butyl, sec.-butyl, n-pentyl, 2-pentyl, n-hexyl, n-heptyl, 3-heptyl, n-octyl and n-dodecyl.

An aryl group $R_1$ can be unsubstituted or substututed, for example by 1 or 2 halogen atoms, especially chlorine or bromine, or 1 or 2 nitro groups or by 1 or 2 alkyl or alkoxy groups having 1–4, in particular 1 or 2, C atoms. Examples of such aryl groups are phenyl, p-nitrophenyl, 3,5-dinitrophenyl, p-tolyl, o-tolyl, 4-chloro-1-nitrophenyl, 2-methoxyphenyl, naphthyl and β-chloronaphthyl.

A compound of the formula II in which $R_1$ is a hydrogen atom, alkyl having 1–4 C atoms or phenyl and $M\oplus$ is an Na cation is preferably used in the process according to the invention.

An alkyl group $R_2$ can also be straight-chain or branched and unsubstituted or substituted. Suitable substituents are the same as those for an alkyl group $R_1$. A cycloalkyl group $R_2$ and a benzyl group may likewise carry these substituents.

Preferably, a compound of the formula III in which $R_2$ is alkyl having 1–4 C atoms and X is a chlorine, bromine or iodine atom is used in the process accoding to the invention, or dimethyl sulfate is used as the alkylating agent.

The compounds of the formulae II and III are known compounds.

Examples of suitable polar aprotic solvents are dimethylformamide, dimethylacetamide, dimethylpropionamide, N-methylpyrrolidone, dimethyl sulfoxide, sulfolane, hexamethylphosphoric acid triamide and tetramethylurea, or the compound to be synthesised.

The amount of polar aprotic solvent to be used in the process according to the invention is not critical. The solvent is generally used in an amount such that the starting compound of the formula II is in the form of a 5–70% solution, preferably a 10–50% solution.

The process according to the invention can be carried out within a wide temperature range from about 20° to 180° C. The preferred reaction temperature is between 40° and 120° C.

The N-substituted N-cyanocarboxylic acid amides prepared according to the invention can be used as starting substances for the preparation of isomelamines. Deacylation of the compounds of the formula I gives N-alkylcyanamides, which can be trimerised to give trialkylisomelamines.

We have furthermore found that the N-substituted N-cyanocarboxylic acid amides obtained by the process according to the invention are useful hardeners for epoxide resins.

The present invention thus also relates to the use of the N-substituted N-cyanocarboxylic acid amides of the formula 1 is curable mixtures consisting of epoxide resins and the N-cyanocarboxylic acid amides.

The amount of N-substituted N-cyanocarboxylic acid amide used as the hardener in these curable mixtures is usually calculated such that 0.75 to 1.25 equivalents of N-cyanocarboxylic acid amide group are present per 1 epoxide equivalent. Equivalent amounts of the N-substituted N-cyanocarboxylic acid amide and the epoxide resin component are preferably used.

Epoxide resins in which groups of the formula IV

in which either $R_3$ and $R_5$ are each hydrogen atoms, in which case $R_4$ is a hydrogen atom or a methyl group, or $R_3$ and $R_5$ together are $-CH_2CH_2-$, in which case $R_4$ is a hydrogen atoms, are bonded directly to oxygen, nitrogen or sulfur atoms can preferably be used for the curable mixtures.

Examples of such resins are polyglycidyl and poly-β-methylglycidyl) esters, which can be obtained by reacting compounds containing two or more carboxylic acid groups per molecule with epichlorohydrin, glycerol dichlorhydrin or β-methylepichlorohydrin in the presence of an alkali. Such polyglycidyl esters can be dirived from aliphatic polycarboxylic acids, for example oxalic acid, succinic acid, glutaric acid, adipic acid, sebacic acid or dimerised or trimerised linoleic acid, from cycloaliphatic polycarboxylic acids, such as tetrahydrophthalic acid, 4-methyltetrahydrophthalic acid, hexahydrophthalic acid or 4-methylhexahydrophthalic acid, and from aromatic polycarboxylic acids, such as phthalic acid, isophthalic acid or terephthalic acid.

Further examples are polyglycidyl and poly(β-methylglycidyl) ethers, which can be obtained by reacting a compound containing at least two free alcoholic and/or phenolic hydroxyl groups per molecule with the corresponding epichlorohydrin under alkaline conditions, or in the presence of an acidic catalyst with subsequent treatment with alkali. These ethers can be prepared, with epichlorohydrin, from acyclic alcohols, such as ethylene glycol, diethylene glycol and higher poly-(oxyethylene) glycols, propane-1,2-diol and poly-(oxypropylent) glycols, propane-1,3-diol, butane-1,4-diol, hexane-2,4,6-triol, glycerol, 1,1,1-trimethylolpropane, pentaerythritol or sorbitol, from cycloaliphatic alcohols, such as resorcitol, quinitol, bis-(4-hydroxycyclohexyl)-methane, 2,2-bis-(4-hydroxycyclohexyl)-propane or 1,1-bis-(hydroxymethyl)-cyclohex-3-ene, and from alcohols with aromatic nuclei, such as N,N-bis-(2-hydroxyethyl)-aniline or p,p'-bis-(2-hydroxyethylamino)-diphenylmethane. Other epoxide resins which are also suitable are those obtained from mononuclear phenol, such as resorcinol or hydroquinone, and polynuclear phenols, such as bis-(4-hydroxyphenyl)-methane, 4,4'-dihydroxydiphenyl, bis-(4-hydroxyphenyl) sulfone, 1,1,2,2-tetrakis-(4-hydroxyphenyl)-ethane, 2,2-bis-(4-hydroxyphenyl)-propane (bisphenol A) or 2,2-bis-(3,5-dibromo-4-hydroxyphenyl)-propane, and novolaks formed from aldehydes, such as formaldehyde, acetaldehyde, chloral or furfurol, with phenols, such as phenol itself or phenol which is ring-substituted with chlorine atoms or alkyl groups each having not more than nine carbon atoms, such as 4-chlorophenol, 2-methylphenol and 4-tert.-butylphenol.

Examples of other suitable poly-(N-glycidyl) compounds include those which can be obtained by dehydrochlorination of the reaction products of epichlorohydrin with amines containing at least two amino-hydrogen atoms, such as aniline, n-butylamine, bis-(4-aminophenyl)-methane or bis-(4-methylaminophenyl)-methane, and triglycidyl isocyanurate or N,N'-diglycidyl derivatives of cyclic alkyleneureas, such as ethyleneurea or 1,3-propyleneurea, or hydantoins, such as 5,5-dimethylhydantoin.

Examples of epoxide resins carrying groups of the formula IV in which $R_3$ and $R_5$ together are a —CH$_2$CH$_2$ group are bis-(2,3-epoxycyclopentyl) ether, 2,3-epoxycyclopentyl-glycidyl ether and 1,2-bis-(2,3-epoxycyclopentyloxy)-ethane.

Epoxide resins in which some or all of the epoxide groups are non-terminal, such as vinylcyclohexane dioxide, limonene dioxide, dicyclopentadiene dioxide, the 3,4-epoxycyclohexylmethyl ester of 3',4'-epoxy cyclohexanecarboxylic acid and its 6,6'-dimethyl derivative, the bis-(3,4-epoxycyclohexanecarboxylic acid ester) of ethylene glycol, bis-(3,4-epoxy-6-methylcyclohexyl) adipate and 3-(3,4-epoxycyclohexyl)-8,9-epoxy-2,4-dioxaspiro[5,5]-undecane, can also be used.

The curable mixtures according to the invention can also contain plasticising agents, such as dibutyl phthalate, dioctyl phthalate or tricresyl phosphate, or additives, such as fillers, reinforcing agents, colorants, flow control agents, flame-retardant substances and mould release agents. Examples of suitable extenders, fillers and reinforcing agemts are asbestos, asphalt, bitumen, glass fibres, textile fibres, carbon or boron fibres, mica, aluminas, gypsum, titanium dioxide, chalk, quartz flour, cellulose, kaolin, ground dolomite, wollastonite, silica having a large specific surface area (obtainable under the tradename "Aeerosil"), aluminas modified by long-chain amines (obtainable under the tradename "Bentone"), powdered poly-(vinyl chloride), polyolefin or aminoplast, and metal powders, such as aluminium powder or iron powder. Flame-retarding agents, such as antimony trioxide, can also be added to the curable mixtures.

In the examples which follow and which describe the invention, parts are by weight, unless indicated otherwise.

EXAMPLE 1

N-Isopropyl-N-cyanacetamide 31.8 g (0.30 mol) of sodium acetylcyanamide are dissolved in 75 ml of dimethylformamide at 100° C., and 36.9 g (0.30 mol) of isopropyl bromide are added dropwise in the course of 1½ hours. The mixture is allowed to afterreact at 100° C. for 3 hours, and then 200 ml of acetone are added and the NaBr which has precipitated is filtered off with suction (28.2 g=0.27 mol). The acetone is then removed on a rotary evaporator and the residue is distilled under a waterpump vacuum in order to isolate all the distillable constituents. Fractional distillation of this distillate over a spinning bank column give 14.3 g (37.8% of theory) of a product of boiling point 107° C./90 mbar which, according to gas chromatography, is a single product.

| Elementary analysis: $C_6H_{10}N_2O$ (M = 126.16) | | | |
|---|---|---|---|
| calculated: | C 57.12% | found: | C 57.07% |
| | H 7.99% | | H 8.14% |
| | N 22.21% | | N 22.28% |

$^1$H-nmr spectrum in ppm: 4.4 (septet, NCH); 2.3 (singlet, CH$_3$CO); 1.2 (doublet, CH$_3$).

Investigation by gas chromatography shows that the first and last runnings contain a total of another 6.9 g (18.3%) of the above compound. The total yield is thus 56.1% (of theory). 2.7 g (7.1%) of pure N-cyanoacetimide isopropyl ester

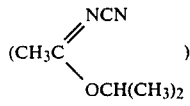

of boiling point 135° C./90 mbar are obtained as a by-product.

EXAMPLE 2

N-n-Butyl-N-cyanoacetamide.

221 g (2.085 mols) of sodium acetylcyanamide are dissolved in 500 ml of dimethylformamide at 90° C., the mixture is allowed to cool to 70° C. and 285.6 g (2.085 mols) of n-butyl bromide are then added dropwise at 70° C. in the course of 1½ hours. The mixture is allowed to after-react at 70° C. for 10 hours, and the NaBr which has precipitated is filtered off with suction and the entire distillable constituent is removed from the filtrate by vacuum distillation. Fractional distillation of this distillate over a packed column 60 cm high gives 216.4 g (74.1% of theory) of pure product of boiling point 105° C./34 mbar.

| Elementary analysis: $C_7H_{12}N_2O$ (M = 140.19) | | | |
|---|---|---|---|
| calculated: | C 59.98% | found: | C 59.90% |
| | H 8.63% | | H 8.82% |
| | N 19.99 | | N 19.92% |

$^1$H-NMR spectrum in ppm: 3.4 (triplet, NCH$_2$); 2.2 (singlet, CH$_3$CO); 1.4 (multiplet, CH$_2$); 0.8 (triplet, CH$_3$).

EXAMPLE 3

N-Isobutyl-N-cyanoacetamide 167.6 g (1.20 mols) of isobutyl bromide are added dropwise to a solution of 140.5 g (1.33 mols) of sodium acetylocyanamide in 150 ml of dimethylformamide in the course of 1½ hours. The mixture is stirred at 100° C. for 20 hours and allowed to cool, 600 ml of acetone are added for better precipitation of the NaBr, and the mixture is filtered with suction. The filtrate is freed from the acetone on a rotary evaporator and is shaken with 500 ml of H$_2$O, 40 g of glacial acetic acid and 250 ml of chloroform at pH 4-5 in a separating funnel in order to remove salt residues. The product phase is separated off and subsequently extracted with three 50 ml portions of CHCl$_3$, the cobined extracts are dried with NA$_2$SO$_4$, the CHCl$_3$ is removed on a rotary evaporator and the residue is subjected to fractional distillation over a packed column. 93.3 g (55.5% of theory) of pure porduct of boiling point 81° C./17 mbar are obtained. Distillation of the first runnings and of the residue over a spinning band column gives a further 17.4 g (10.3%) of produt, so that the total yield is 65.8%.

| Elementary analysis: $C_7H_{12}N_2O$ (M = 140.19) | | | |
|---|---|---|---|
| calculated: | C 59.98% | found: | C 59.97% |
| | H 8.63% | | H 8.88% |
| | N 19.99% | | N 20.00% |

$^1$NMR spectrum in ppm: 3.3 (doublet, CH$_2$); 2.35 (singlet, CH$_3$CO); 2.0 (septet, CH); 0.9 (doublet, CH$_3$).

8.6 g (5.1%) of N-cyanoacetimide isobutyl ester

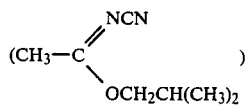

of boiling point 105° C./17 mbar are formed as a by-product.

EXAMPLE 4

N-n-Heptyl-N-cyanoacetamide 36.0 g (0.20 mol) of 1-bromoheptane are added dropwise to a solution of 21.2 g (0.20 mol) of sodium acetylcyanamide in 50 ml of dimethylformamide at 85° C. The mixture is allowed to after-react for 2 hours and the NaBr is filtered off with suction at room temperature. The filtrate is treated with 50 ml of H$_2$O and the mixture is extracted with cloroform. The solvent is separated off on a rotary evaporator and the crude product is distilled over a rotating belt column to give 24.3 g (66.7% of theory) of pure product of boiling point 124° C./18 mbar.

| Elementary analysis: $C_{10}H_{18}N_2O$ (M = 182.27) | | | |
|---|---|---|---|
| calculated: | C 65.90% | found: | C 65.87% |
| | H 9.96% | | H 9.93% |
| | N 15.37% | | N 15.39% |

$^1$H-NMR spectrum in ppm: 3.5 (triplet, CH$_2$N); 2.3 (singlet, CH$_3$CO); 0.9 (triplet, CH$_3$).

EXAMPLE 5

N-Benzyl-N-cyanoacetamide 106.1 g (1.0 mol) of sodium acetylcyanamide and 151.9 g (1.0 mol+20% excess) of benzyl chloride are reacted in 500 ml of dimethylformamide at 100°-112° C. for 4 hours and 20 minutes and the mixture is then filtered. The filtrate is evaporated completly in vacuo on a rotary evaporator at 60° C. to give 146.7 g (88.7% of theory) of a brown viscous residue, which is recrystallised from 290 ml of diisopropyl ether. The yield of pure product of melting point 42° C. is 111.0 g (63.7% of theory).

| Elementary analysis: $C_{10}H_{10}N_2O$ (M = 174.2) | | | |
|---|---|---|---|
| calculated: | C 68.95% | found: | C 68.78% |
| | H 5.79% | | H 5.77% |
| | N 16.08% | | N 15.91% |

USE EXAMPLES

In the examples which follow, the reactivity of the resin/hardener mixture by thermal analysis and the glass transition temperatures are determined as follows:

(a) Thermal Analysis

Differential thermal analysis (DTA) is used to determine the reactivity. About 20 mg of the resin/hardener mixture to be tested are warmed in a small Al crucible in the measuring chamber of a DTA apparatus (TA-2000 from METTLER Instrument AG, CH-Greifensee) with a heating-up rate of 40° C./minute, and the temperature difference in comparison with an empty crucible warmed at the same time is continuously recorded. The temperature for the start of the reaction ($T_S$), for the maximum rate of reaction ($T_{RR\ max}$) and for the end of the reaction ($T_E$) are read off from the resulting curve as parameters which characterise the reactivity.

(b) Determination of the glass transition temperature (GTT)

In each case 4 g of the resin/hardener mixture are poured into a thin-walled Al crucible about 5 cm in diameter, and are hardened therein. A sample of the disc thus obtained is taken in order to determine the glass transition temperature of the crosslinked polymer with the aid of differential thermal analysis. The specific heat changes at the transition temperature; this change is recorded as the curve obtained from the DTA apparatus (TA-2000 from METTLER Instrumente AG, CH-Greifensee) changes direction. Conclusions relating to the dimensional stability of the resulting polymer under the influence of heat can be drawn from the glass transition temperature.

EXAMPLE I 100 parts of an epoxide resin based on bisphenol A having an epoxide content of 5.78 equivalents/kg and a viscosity of 5,000 mPa.s at 25° C., 56.6 parts of N-methyl-N-cyanoacetamide (corresponding to 1 equivalent of cyano group per 1 epoxide equivalent) and 0.24 part of 1-methyl-imidazole (0.005 mol per 1 epoxide equivalent) are mixed at 50° C. The reactivity (gelling time in minutes (') and seconds (")) of this clear solution and, after hardening, the glass transition temperature (GTT) and the tensile and shear strength are determined.

| Gelling time at | 180° C. | 21'20" |
| | 160° C. | 93' |
| Thermal analysis | $T_S$ | 101° C. |
| | $T_{RRmax}$ | 174° C. |
| | $T_E$ | 228° C. |

After hardening at 120° C. for 6 hours and at 180° C. for 6 hours:
GTT (° C.): 84
Tensile shear strength (N/mm$^2$) according to DIN 53,183: 9.5 (DIN=Deutsche Industrienorm (German Industrial Standard))

EXAMPLE II 100 parts of an epoxide resin based on bis-phenol A having an epoxide content of 2.1 equivalents/kg and a softening range of about 50° C., 20.6 parts of N-methyl-N-cyanoacetamide (corresponding to an equivalent ratio of 1:1) and 0.09 part of 1-methylimidazole are homogenised in a hammer mill. The mixture thus obtained has the following properties:

| Gelling time at | 180° C. | 17'20" |
| | 160° C. | 46'30" |
| | 140° C. | 75' |
| Thermal analysis | $T_S$ | 162° C. |
| | $T_{RRmax}$ | 156° C. |
| | $T_E$ | 248° C. |

After hardening at 120° C. for 6 hours and at 180° C. for 6 hours:
GTT (° C.): 87
Tensile shear strength (N/mm$^2$): 19

EXAMPLE III

Example II is repeated but no 1-methylimidazole is added as an accelerator. The homogeneous mixture has the following properties:

| Gelling time at | 180° C. | 21'50" |
| Thermal analysis | $T_S$ | 123° C. |
| | $T_{RRmax}$ | 165° C. |
| | $T_E$ | 242° C. |

After hardening at 120° C. for 6 hours and at 180° C. for 6 hours:
GTT (° C.): 89
Tensile shear strength (N/mm$^2$): 17

EXAMPLE IV

Example II is repeated with a different epoxide resin based on bisphenol A, which has an epoxide content of 0.52 equivalent/kg and a softening range of 90°–100° C. 5.1 parts of N-methyl-N-cyanoacetamide and 0.021 parts of 1-methylimidazole are added to 100 parts of the epoxide resin.

The homogeneous mixture has the following properties:

Gelling time at 140° C.: 24'30"

| Thermal analysis | $T_S$ | 137° C. |
| | $T_{RRmax}$ | 172° C. |
| | $T_E$ | 241° C. |

After hardening at 120° C. for 6 hours and at 180° C. for 6 hours:
GTT (° C.): 105
Tensile shear strength (N/mm$^2$): 18.5

EXAMPLE V

Example II is repeated, the epoxide resin first being heated to 120° C. and the N-methyl-N-cyanoacetamide and 1-methylimidazole then being dissolved therein. Before sheets of moulded material are cast, the hot solution is subjected to vacuum treatment in order to free it from the air which has been stirred in. After hardening at 120° C. for 12 hours, the following properties are measured on the sheets of moulded material:

| Impact bending strength (KJ/m$^2$) | 28 |
| Flexural strength (N/mm$^2$) | 122/50* |
| Deflection (mm) | 7/>20* |
| Heat distortion point (°C.) | 87 |
| GTT (°C.) | 90 |
| Absorption of H$_2$O after storage in water at room temperature for 4 days (%) | 0.27 |
| Tensile shear strength (N/mm$^2$) | 19 |
| Dielectric loss factor tgδ; 1% value | 70° C. |
| 5% value | 85° C. |
| Dielectric constant at 23° C. | 3.2 |
| Specific volume resistivity at 23° C. (Ω · cm) | 5.6 × 10$^{16}$ |

*1st value under maximum load
2nd value on breaking

What is claimed is:
1. A process for the preparation of an N-substituted N-cyanocarboxylic acid amide of the formula I

in which $R_1$ is a hydrogen atom, alkyl having 1–16 C atoms, cycloalkyl having 5–8 C atoms or aryl having 6 or 10 ring C atoms and $R_2$ is alkyl having 1–8 C atoms, cycloalkyl having 5–8 C atoms or benzyl, which comprises reacting, in a molar ratio, 1 mol of an N-cyanocarboxylic acid amide salt of the formula II

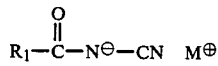

(II)

in which $R_1$ is as defined under formula II and $M^+$ is an Na or K cation, either with 1 mol of a compound of the formula III

(III)

in which $R_2$ is as defined under formula I and X is a chlorine, bromine or iodine atom, or, if $R_2$ in formula I is methyl or ethyl, with 1 mol of dimethyl or diethyl sulfate or trimethyl or triethyl phosphonate, as the alkylating agent, in a polar aprotic solvent.

2. A process according to claim 1, wherein a compound of the formula II in which $R_1$ is a hydrogen atom, alkyl having 1 to 4 C atoms or phenyl and $M\oplus$ is an Na cation is used.

3. A process according to claim 1, wherein a compound of the formula III in which $R_2$ is alkyl having 1 to 4 C atoms and X is a chlorine, bromine or iodine atom is used, or dimethyl sulfate is used as the alkylating agent.

* * * * *